US011978469B1

(12) United States Patent
Woodruff et al.

(10) Patent No.: US 11,978,469 B1
(45) Date of Patent: May 7, 2024

(54) AMBIENT NOISE AWARE DYNAMIC RANGE CONTROL AND VARIABLE LATENCY FOR HEARING PERSONALIZATION

(71) Applicant: Apple Inc., Cupertino, CA (US)

(72) Inventors: John Woodruff, Santa Cruz, CA (US); Yang Lu, Cupertino, CA (US); Tom-Davy W. Saux, Los Gatos, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/866,735

(22) Filed: Jul. 18, 2022

Related U.S. Application Data

(62) Division of application No. 15/931,394, filed on May 13, 2020, now Pat. No. 11,393,486.

(60) Provisional application No. 62/855,348, filed on May 31, 2019.

(51) Int. Cl.

| | |
|---|---|
| ***H04R 29/00*** | (2006.01) |
| ***G10L 21/0232*** | (2013.01) |
| ***G10L 21/0316*** | (2013.01) |
| ***G10L 25/51*** | (2013.01) |
| ***G10L 25/84*** | (2013.01) |
| ***H04R 1/40*** | (2006.01) |
| ***H04R 3/00*** | (2006.01) |

(52) U.S. Cl.
CPC ...... *G10L 21/0232* (2013.01); *G10L 21/0316* (2013.01); *G10L 25/51* (2013.01); *G10L 25/84* (2013.01); *H04R 1/406* (2013.01); *H04R 3/005* (2013.01); *H04R 29/005* (2013.01)

(58) Field of Classification Search
CPC . G10L 21/0232; G10L 21/0316; G10L 25/51; G10L 25/84; H04R 1/406; H04R 3/005; H04R 29/005
See application file for complete search history.

(56) References Cited

U.S. PATENT DOCUMENTS

| | | | | |
|---|---|---|---|---|
| 4,061,875 | A * | 12/1977 | Freifeld | H04M 1/19 381/72 |
| 9,431,982 | B1 * | 8/2016 | Yang | H03G 7/002 |
| 10,355,658 | B1 * | 7/2019 | Yang | H03G 9/025 |
| 10,867,617 | B1 * | 12/2020 | Nakagawa | G10L 21/0224 |
| 2006/0262938 | A1 * | 11/2006 | Gauger, Jr. | H03G 7/002 704/E21.002 |
| 2015/0112671 | A1 * | 4/2015 | Johnston | H04R 3/005 704/233 |
| 2021/0067884 | A1 * | 3/2021 | Best | H04R 25/45 |

* cited by examiner

*Primary Examiner* — Joseph Saunders, Jr.
(74) *Attorney, Agent, or Firm* — Aikin & Gallant, LLP

(57) ABSTRACT

Signal to noise ratio, SNR, is determined in an acoustic ambient environment of an against-the-ear audio device worn by a user, wherein the acoustic ambient environment contains speech by a talker. When the SNR is above a threshold, dynamic range control is applied, as positive gain versus input level, to an audio signal from one or more microphones of the audio device. When the SNR is below the threshold, the dynamic range control applies as zero gain or negative gain to the audio signal. Other aspects are also described and claimed.

20 Claims, 3 Drawing Sheets

AMBIENT NOISE AWARE DYNAMIC RANGE CONTROL AND VARIABLE LATENCY FOR HEARING PERSONALIZATION

This is a divisional of U.S. patent application Ser. No. 15/931,394 filed May 13, 2020 which claims the benefit of the earlier filing date of U.S. Provisional Application No. 62/855,348 filed May 31, 2019.

FIELD

An aspect of the disclosure here relates to digital audio signal processing techniques for improving how sound is produced by an against the ear hearing device, such as a headphone or a mobile phone handset. Other aspects are also described.

BACKGROUND

Consumer electronic devices referred to as against the ear hearing devices, such as headphones and mobile phone handsets, are used in a variety of different ambient sound environments. The listening experience of users of these devices is affected by changing ambient sound environments.

SUMMARY

One aspect of the disclosure here is a customized compressor for applying dynamic range control in an audio system that has an against-the-ear audio device (personal listening device.) Also referred to as a noise aware compressor, the compressor is customized or configured according to the particular acoustic ambient environment to improve the sound reproduced for the user of the device.

Another aspect here aims to compensate for reduced hearing sensitivity of the user of the device, using an adaptive feedback canceller (AFC) but in a low latency manner which depends on the level of hearing of loss.

The audio system has an ambient sound enhancement (ASE) function, in which an against-the-ear audio device having one or more speakers converts a digitally processed version of an input audio signal into sound (at the ear of a user of the device.) When ASE is active, the input audio signal contains ambient or environmental sound pick up via one or more microphones in the device; in a "playback" situation, the input audio signal is a combination signal that also contains program audio such as music or the voice of a far end user during a phone call. When ASE is inactive, the input audio signal may contain program audio but not ambient sound pick up.

The audio system digitally processes its input audio signal using a dynamic range control circuit (amplitude compressor), which processes the input audio signal by modifying it as a function of the input level of the input audio signal. This produces an output audio signal in which soft sounds in the input signal are amplified or made louder (when the output audio signal is being converted into sound by one or more speakers of the device.) In other words, the compressor is essentially lifting the quiet sounds into a more easily hearable range—this is also referred to as upward compression. This lifting of the quiet sounds may also need to be varied as a function of frequency, because with many individuals the reduction in their hearing sensitivity is greater at the upper frequency range of hearing. The process may leave loud sounds unchanged.

The audio system also has another digital audio signal processing tool that helps compensate for an individual's reduced hearing sensitivity, namely a noise suppresser (noise reducer.) In one aspect, the noise suppressor is active while ASE is active (reproducing ambient sound), and attempts to reduce the undesired parts of the ambient sound. The undesired parts of the ambient sound are those sounds that interfere with for example desired speech by a talker (where both the undesired parts and the desired talker's speech are embedded in the input audio signal.) Such a noise suppressor may use techniques such as fixed spectral shaping, adaptive filtering, and multiple sound pick up channel (multi-channel) statistical filtering.

In one aspect, the dynamic range control circuit operates within the ASE function as follows. The processor determines a signal to noise ratio, SNR, in the acoustic ambient environment of the against-the-ear audio device. When the SNR is high, it responds by applying dynamic range control as positive gain (versus input level), to the input audio signal. But when the SNR is low, it applies zero gain or negative gain to the input audio signal. As an example, when the user's ambient environment is quiet and a friend nearby is talking, the SNR is determined to be high, and as such the dynamic control circuit is applying positive gain as a function of a given range of input level of the ambient sound pickup. When the ambient sound pickup then changes from quiet to loud (e.g., the friend is still talking but the undesired part of the ambient sound has increased due to for example a train arriving or the user walking into a loud restaurant or social club), this causes the processor to determine that the SNR is now low. In response, the processor automatically changes the dynamic range control to apply zero or negative gain (as a function of the given range of input level of the ambient sound pickup.) In this way, the ASE function avoids an uncomfortably loud reproduction of the train arrival sound or the restaurant and social club sounds.

Another method for sound enhancement using the against-the-ear audio device may proceed as follows. An audio signal that is being converted into sound by the against-the-ear audio device is filtered using a filter that has a feedforward gain that may be positive (in terms of dB), to amplify the audio signal. The audio signal is from one or more microphones of the audio device that are picking up ambient sound. A hearing loss level associated with the audio device or a user of the audio device is determined, e.g., using an audiogram. The filter is adjusted to exhibit low latency when the hearing loss level is determined to be below a threshold and high latency when the hearing loss level is determined to be above the threshold.

The above summary does not include an exhaustive list of all aspects of the present disclosure. It is contemplated that the disclosure includes all systems and methods that can be practiced from all suitable combinations of the various aspects summarized above, as well as those disclosed in the Detailed Description below and particularly pointed out in the Claims section. Such combinations may have particular advantages not specifically recited in the above summary.

BRIEF DESCRIPTION OF THE DRAWINGS

Several aspects of the disclosure here are illustrated by way of example and not by way of limitation in the figures of the accompanying drawings in which like references indicate similar elements. It should be noted that references to "an" or "one" aspect in this disclosure are not necessarily to the same aspect, and they mean at least one. Also, in the interest of conciseness and reducing the total number of figures, a given figure may be used to illustrate the features of more than one aspect of the disclosure, and not all elements in the figure may be required for a given aspect.

DETAILED DESCRIPTION

Several aspects of the disclosure with reference to the appended drawings are now explained. Whenever the shapes, relative positions and other aspects of the parts described are not explicitly defined, the scope of the invention is not limited only to the parts shown, which are meant merely for the purpose of illustration. Also, while numerous details are set forth, it is understood that some aspects of the disclosure may be practiced without these details. In other instances, well-known circuits, structures, and techniques have not been shown in detail so as not to obscure the understanding of this description.

Consider as an example a user who is waiting for a train to arrive at a train station and is wearing a headset. The user could be talking to a friend standing next to them. The headset occludes the user's ear and therefore passively attenuates the voice of the friend. If the headset has an ambient sound enhancement function (ASE) that picks up the ambient sound before amplifying it and reproducing it at the user's ear, then it allows the friend's speech to be heard more easily. The arrival of the train however will result in the train sound also being picked up, amplified and reproduced, thereby making it difficult to discern the friend's speech. In another example, the user (while wearing the headset or holding the mobile phone handset again their ear) is walking with their friend to a local social club or restaurant, and upon entering will hear an increase in babble noise (being reproduced by the ASE.)

It is also likely that the same ambient sound environment is perceived (heard) differently by different users of the ASE, as some users have lower dynamic range in their hearing than others such that soft or quiet sounds are barely heard by those particular users. Several digital audio signal processing techniques referred to as personalized ambient sound enhancement (ASE) are described that can improve the experience of listening to the ambient environment for such individuals, particularly in changing ambient sound environments including but not limited to those identified above.

Figure 1:
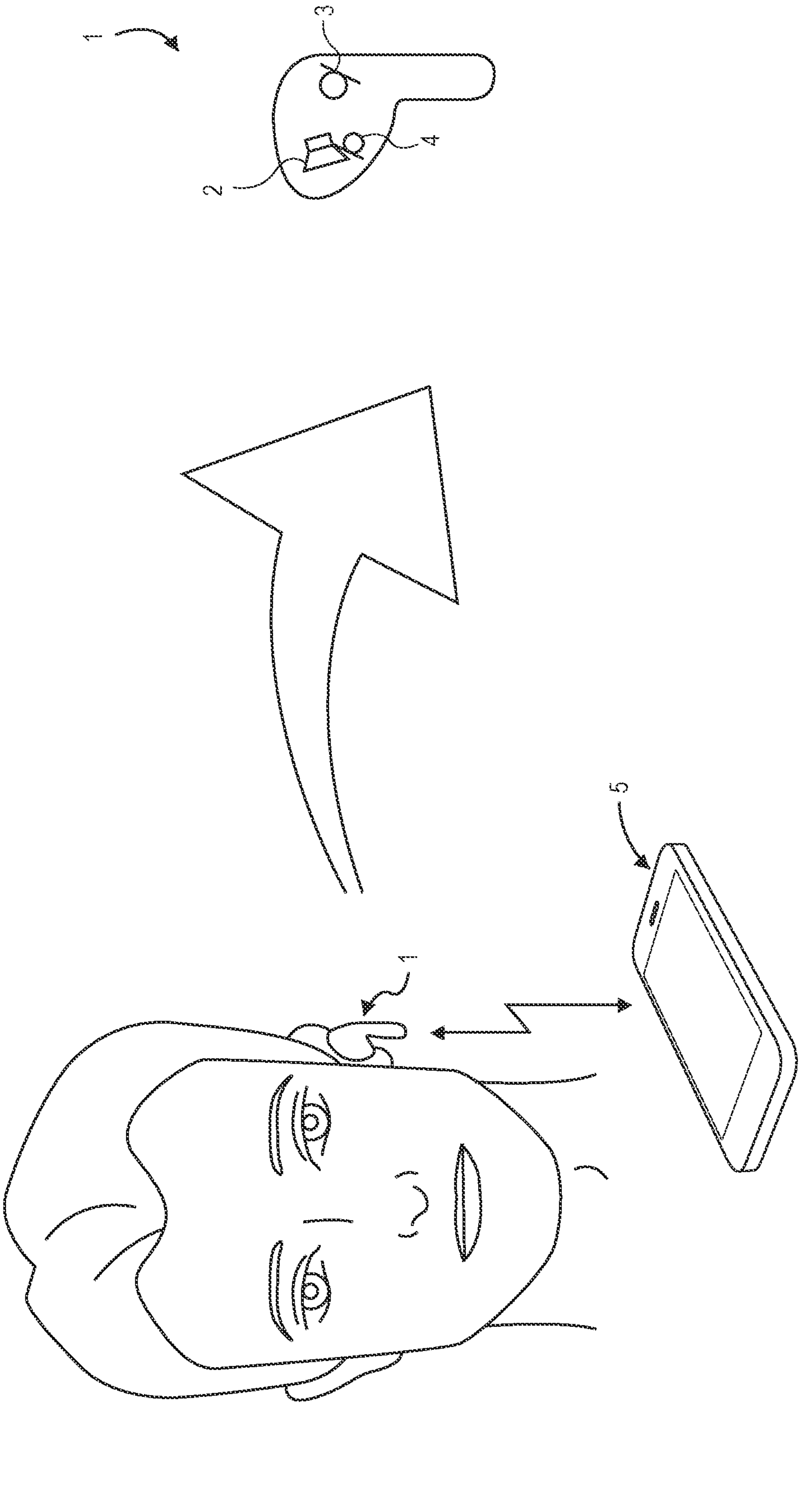
FIG. 1 shows an example against-the-ear device.

FIG. 1 shows an example of an against-the-ear device 1 that is part of an audio system in which a method for personalized ASE can be implemented. The against-the-ear device 1 shown is an in-ear earbud (in-ear headphone which may be a sealing-type having for example a flexible ear tip, or a non-sealing or loose fitting type), which may be one of two headphones (left and right) that make up a headset. The methods described below for personalized ASE can be implemented for one or both of the headphones that make up a headset. Alternatives (not shown) to the in-ear earbud include an on-the-ear headphone, an over-the-ear headphone, and a mobile phone handset. The against-the-ear device 1 is shown in use, by its user (who may also be referred to as a listener or a wearer.) The against-the-ear device 1 has an against-the-ear acoustic transducer or speaker 2 (arranged and configured to reproduce sound directly into an ear of a user), an external microphone 3 (arranged and configured to receive ambient sound directly), and an internal microphone 4 (arranged and configured to directly receive the sound reproduced by the speaker 2.) These may all be integrated in a housing of the against-the-ear device 1. In some instances, the transducers and the electronics that process and produce the transducer drive signals (output microphone signals and an input audio signal to drive the speaker 2) can be placed in the same housing. The electronics may include an audio amplifier to drive the speaker 2 with the input audio signal, a microphone sensing circuit or amplifier that receives the microphone signals converts them into a desired format for digital signal processing, and a digital processor and associated memory. The memory stores instructions for configuring the processor (e.g., instructions to be executed by the processor) to perform digital signal processing tasks discussed below in more detail.

In one aspect, some of the electronics reside in another device, separate from the against-the-ear device 1. For instance, the against-ear-device 1 may be a headphone that is connected to an audio source device 5, depicted in the example of FIG. 1 as a smartphone, via a wired connection (in which case there may be no need for a power source in the headphone housing) or via a wireless connection (e.g., a BLUETOOTH link.) In both cases, the connection to the audio source device 5 may be used to deliver a processed version of the input audio signal to the headphone (where it drives the speaker 2), from the external microphone 3 being for example in a housing of the audio source device 5.

There are many instances where a user, while wearing the against-the-ear device 1, may have a preference or need for hearing at a higher sound pressure level, SPL, than would the average person. To meet the preference or need of such a user, the ambient sound is amplified by the audio system in accordance with a hearing profile of the user, and reproduced through the speaker 2. This is also referred to here as a personalized ASE function. If the user, while wearing the headset or holding the smartphone against their ear, then enters a social club that has a much louder ambient sound level, the amplified sound may appear (be heard as) distorted or uncomfortably loud. The audio system should automatically reduce the reproduced ambient sound level in such a condition, based on the wearer's hearing profile and based on the ambient sound level. The audio system may do so in accordance with several aspects of the disclosure here.

Figure 2:
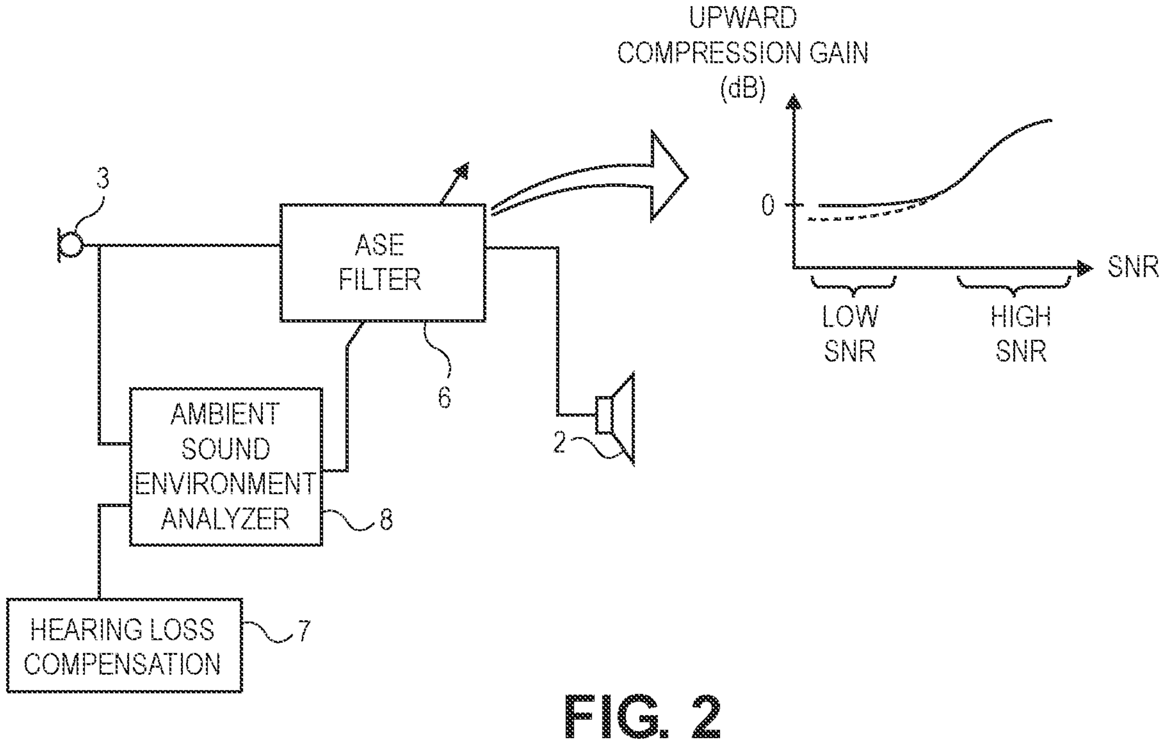
FIG. 2 is a block diagram of an audio system and a related method for personalized ambient sound enhancement, ASE, using a customized compressor for dynamic range control.

FIG. 2 is a block diagram of the audio system and a related method for personalized ASE in which a compressor that performs dynamic range control of the amplified ambient sound is customized not only to the hearing profile of the user but also to the particular acoustic environment of the user. Ambient sound in the acoustic environment of the user (who is wearing or using the against the ear audio device 1) is picked up by the external microphone 3. The output, digitized microphone signal (also referred to as input audio signal) is then filtered by an ASE filter 6. The ASE filter 6 may encompass several digital signal processing operations that are performed upon its input audio signal to help compensate for an individual's reduced hearing sensitivity and otherwise make the reproduced audio signal sound more pleasing to the user (e.g., a talker's speech is more intelligible.) These may include dynamic range control (described further below as upward dynamic range compression), noise suppression (noise reduction), and perhaps other operations. In one aspect, the noise suppressor is active while ASE is active (reproducing ambient sound), and attempts to reduce the undesired parts of the ambient sound. The undesired parts of the ambient sound are those sounds that interfere with for example desired speech by a talker (where both the undesired parts and the desired talker's speech are embedded in the input audio signal.) Such a noise suppressor may use techniques such as fixed spectral shaping, adaptive filtering, and multiple sound pick up channel (multi-channel) statistical filtering.

The transfer function of the ASE filter 6 is variable, e.g., on a frame by frame basis where each frame may include for example 1-10 milliseconds of the microphone signal, and may be set by an ambient sound environment analyzer 8. The input audio signal is filtered by an ASE filter 6 in the sense of a level-dependent and frequency-dependent gain that varies over time (the filtering here is thus nonlinear and time varying.) The analyzer 8 configures the ASE filter 6 based on combining i) information it has derived from the ambient sound pickup channel (e.g., the audio signal from the external microphone 3) and ii) information relating to a hearing profile of the user provided by a hearing loss compensation block (HLC 7.)

As used herein, the "hearing profile" refers to a set of data that defines the hearing needs and preferences of the user including hearing level or hearing loss, as dB HL, across various frequencies of interest within the range of normal human hearing (also referred to here as auditory sub-bands.) The hearing profile may additionally specify quiet, comfortable and loud listening levels, frequency-dependent amplification preferences across different types of audio content (e.g., voice phone call, podcast, music, movies) or the user's sensitivity to noise or sound processing artifacts. The hearing profile may be derived from for example a stored audiogram of the user and may include outcomes of other standard hearing evaluation procedures such as Speech-in-Noise testing or measurement of otoacoustic emissions. In addition, or as an alternative, to objective hearing evaluations such as the audiogram, the hearing profile may be the result of a process that generates acoustic stimuli using the speakers in the against-the-ear audio device and monitors or evaluates the user's responses to those acoustic stimuli (e.g., as verbal responses that have been picked up by a microphone of the audio device, or as manual responses entered by the user through a graphical user interface of the audio system.) The hearing profile may thus define the hearing preference or hearing sensitivity of the user, for example in terms of hearing level in dB (dB HL.)

It should be noted that while the figures here show a single microphone symbol in each instance (external microphone 3 and internal microphone 2), this is being used to generically refer to a sound pickup channel which is not limited to being produced by a single microphone. In many instances, the sound pickup channel may be the result of combining multiple microphone signals, e.g., by a beamforming process performed on a multi-channel output from a microphone array.

The ambient sound as picked up by the external microphone 3 is amplified by the ASE filter 6, by being upward compressed (in the sense of dynamic range control), in accordance with a gain parameter which is set by the ambient sound environment analyzer 8. This compressed audio signal then drives the speaker 2 resulting in the amplified ambient sound content being reproduced at the user's ear.

The compression (dynamic range control) performed by the ASE filter 6 is customized as follows. The analyzer 8 determines signal to noise ratio, SNR, in the input audio signal (from the external microphone 3.) Here, the acoustic ambient environment (and hence the input audio signal) contains speech by a talker (who is not the user.) When determining that the SNR is above a threshold, the ASE filter 6 becomes configured to apply upward compression to the input audio signal. This is also referred to here as reducing dynamic range by applying positive gain, in terms of dB, versus input level (the level of the input audio signal from the external microphone 3.) But when determining that the SNR is below the threshold, the ASE filter becomes configured to apply zero gain or negative gain, in terms of dB, to the input audio signal. The negative gain as a function of low SNR is depicted in the graph of FIG. 1 as a dotted line. Note that in both instances the gain is being applied to the soft sounds, and not the loud sounds (in the input audio signal), and its value is determined in accordance with the hearing profile of the user (who is wearing the against the ear audio device 1). In this manner, the dynamic range control (while personalized for user's hearing profile) also becomes ambient noise aware, so that when SNR in the ambient sound pickup channel drops below a threshold, the dynamic range control gain being applied by the ASE filter drops to zero or negative (in terms of dB). That makes the hearing more comfortable when the user enters a noise or loud environment or when for example a train arrives.

In one aspect, determining the SNR comprises processing the input audio signal to produce a noise estimate and a main signal estimate (and computing a ratio of those two estimates.) The noise and main signal estimates may be computed on a per frequency bin basis, and the resulting SNR may be on a per frequency bin basis, and which may be updated in each audio frame. The updated SNR may then be translated into the gain parameter of the ASE filter based on knowledge of the hearing profile of the user. The updated gain parameter, on a per frequency bin basis, may then be applied to the input audio signal (from the external microphone 3) in frequency domain, by the ASE filter 6.

Figure 3:
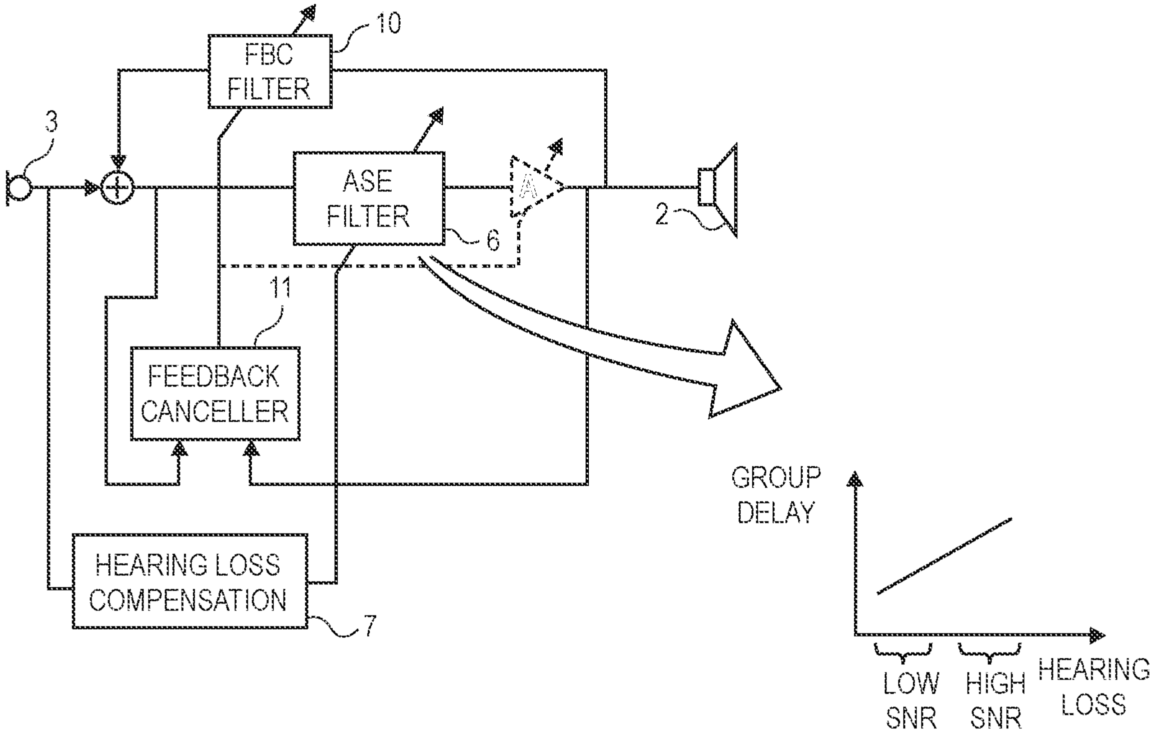
FIG. 3 is a block diagram of an audio system and related method for personalized ASE in which the group delay in the forward path of the ASE is varied as a function of the level of hearing loss.

Turning now to FIG. 3, this is a block diagram of an audio system and related method for personalized ASE in which the group delay in the forward path of the ASE is varied as a function of the level of hearing loss. It has been determined that if the against the ear audio device 1 is reproducing wide audio bandwidth and the user has mild hearing loss, such a user is more likely to be sensitive to the latency introduced by the ASE path (through the ASE filter 6). It is thus desirable to have a latency of less than 1 millisecond introduced by the ASE path, for such users, while other users who have more than mild hearing loss can actually tolerate greater latency (or the greater latency is less noticeable to them.) This result may be achieved as an instance of a more general, digital signal processing method (for ambient sound enhancement in an against the ear audio device), in the audio system of FIG. 3.

Referring to FIG. 3, the ASE filter 6 filters the audio signal coming from the external microphone 3, before the audio signal is converted into sound by the speaker 2 of the against-the-ear audio device 1. The ASE filter 6 does so by applying a feedforward gain (e.g., on a per frequency bin basis, and variable per audio frame.) The feedforward gain may be part of dynamic range control of the input audio signal, applied as a positive gain versus input level to the audio signal in accordance with the hearing profile of the user. The HLC 7 determines the feedforward gain, based on the hearing loss level associated with a user of the audio device 1 (e.g., by accessing a stored audiogram of the user.) The ASE filter 6 may also perform noise suppression.

The ASE filter 6 is adjusted to perform with low latency, when determining the hearing loss level is below a threshold (the user has a mild hearing loss, for example as given above.) But if the HLC 7 determines the hearing loss level is above the threshold, then the ASE filter 6 is configured to perform with high latency. In terms of group delay of a digital filter, the latency of the ASE filter 6 will thus exhibit the relationship or curve shown in FIG. 3, where the group delay is low when the applied gain is low (hearing loss, HL, is low), and high when the applied gain is high (HL is high.) The latency may refer to the delay to which the input audio signal is subjected, between the input of the HLC 7 and the output of the ASE filter 6.

The above-described control of hearing loss-dependent latency in the ASE path may be applied in conjunction with a feedback cancellation, FBC, filter 10 that is filtering the output of the ASE filter 6. This may be during an ambient sound enhancement mode of operation in which only the ambient sound pick up channel is being amplified and reproduced—there is no playback signal (no user audio content such as music or a phone call.) The FBC filter 10 can also be used when there is playback, such as music or a phone call. The FBC filter 10 attempts to remove the acoustic coupling of the speaker 2 into the external microphone 3, particularly when the feedforward gain being applied to the input audio signal is high. The output of the FBC filter 10 may be added to input audio signal coming from the external microphone 3 to result in a combined signal at the input of the ASE filter 6.

Alternatively, still referring to FIG. 3, the output of the FBC filter 10 may be used indirectly to modulate a scalar gain block A at the output of the ASE filter 6. That approach may be useful in instances where the FBC control loop could become unstable. That approach may work as follows. The feedback canceller 11 determines what the FBC filter 10 coefficients should be. The FBC filter coefficients are assumed to represent the state of the feedback path (through the FBC filter 10.) When the feedback canceller 11 determines that the feedback path is too strong (possibly leading to an unstable condition), it will in response reduce the gain of the scalar gain block A. Controlling the gain of block A is thus not based on the output of FBC filter 10, which is an audio signal output. Rather, it is based on the output of feedback canceller 11 which are the filter coefficients that define the FBC filter 10.

The feedback cancellation tends to perform better when latency in the ASE path is increased. This means that greater latency may be desirable when more positive gain is being applied (due to greater hearing loss.)

In one aspect, adjusting the ASE filter 6 for high latency comprises re-configuring the ASE filter 6 from a minimum phase filter into a linear phase filter or a maximum phase filter. In other words, the ASE filter 6 is configured as a minimum phase filter in a base or default configuration, exhibiting low latency, unless the HLC 7 (and perhaps in conjunction with other decision makers such the ambient sound environment analyzer 8 of FIG. 2 above) determine that the user has hearing loss that is above a threshold, in which case the ASE filter 6 is set to a high latency configuration.

In another aspect, the hearing loss dependent latency control method may proceed as follows. An input audio signal is being filtered in time domain, for purposes of noise suppression, using a minimum phase filter (while downstream the audio signal is converted into sound by the speaker 2 of the against the ear audio device.) The audio signal may be from one or more microphones of the audio device that are picking up ambient sound, and not an audio program content signal or an audio downlink communications signal. The noise suppression time domain filtering may be in addition to feedforward gain that is applied as a function of a hearing loss level of a user of the audio device. The hearing loss level associated with the audio device or a user of the audio device is determined. When the determined hearing loss level is high, the audio signal, either upstream or downstream of the minimum phase filter, is delayed but not when the hearing loss level is low. Such a delay may occur by, for example, adding a delay in series with the ASE filter 6. The method may further comprise entering an ambient sound enhancement mode of operation in the audio device in which the feedback cancellation is disabled, in response to the hearing loss level being determined as below a threshold (or the feedforward gain is determined to be below a threshold.) Disabling the feedback cancellation may also be beneficial in that it saves computing resources or reduces power consumption in the audio device 1.

Figure 4:
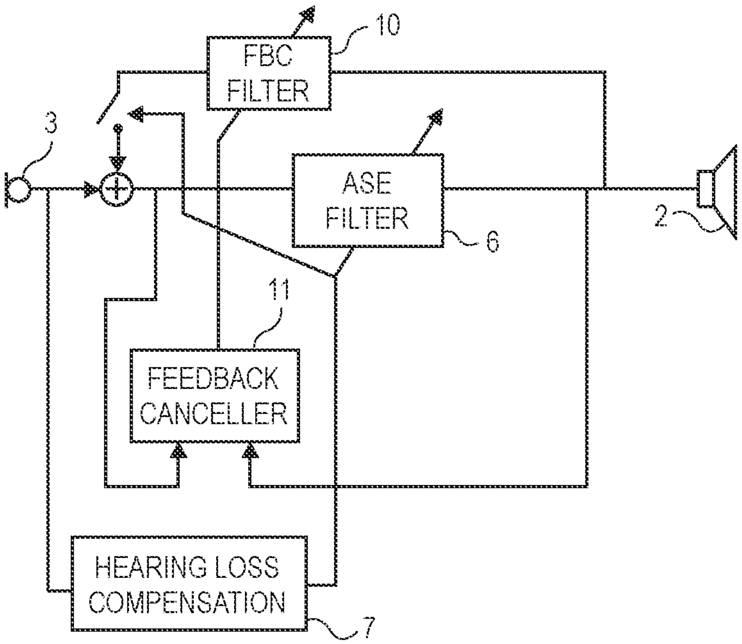
FIG. 4 is a block diagram an audio system and related method for personalized ASE in which the contribution to the forward path of the ASE by a feedback cancellation subsystem is omitted when the level of hearing loss is below a threshold.

Turning now to FIG. 4, this is a block diagram of an audio system and related method for personalized ASE in which the signal contribution by a feedback cancellation subsystem, to the forward path of the ASE (in an attempt to remove echo), is omitted when the level of hearing loss is determined to be below a threshold. Such an audio system has a digital processor (e.g., in the against the ear audio device 1) that performs the method by first determining a hearing loss level associated with the audio device 1 or a user of the audio device 1. The hearing loss level may be determined by the processor accessing a stored audiogram of the user, or by the processing conducting a hearing test in which it produces speech and other sound stimulus signals to drive the speaker 2 and then monitors the user's response to such stimuli (e.g., verbal responses via the internal microphone 2 or the external microphone 3, manual responses entered by the user through a graphic user interface of the smartphone 5 that is paired with a headphone being the audio device 1.) The processor then sets a feedforward gain (in the forward path of the ASE, in the ASE filter 6) into a low range in response to determining that the hearing loss level is below a threshold, or it sets the feedforward gain into a high range in response to determining that the hearing loss level is above the threshold. In response to the feedforward gain being set into the low range, the processor disables a feedback canceller (that would otherwise modify an audio signal to which the feedforward gain is applied and is processed through the ASE filter 6 before being converted into sound by the against-the-ear audio device 1.) In one aspect, if the feedforward is set into the high range, then the processor enables the feedback canceller.

Figure 5:
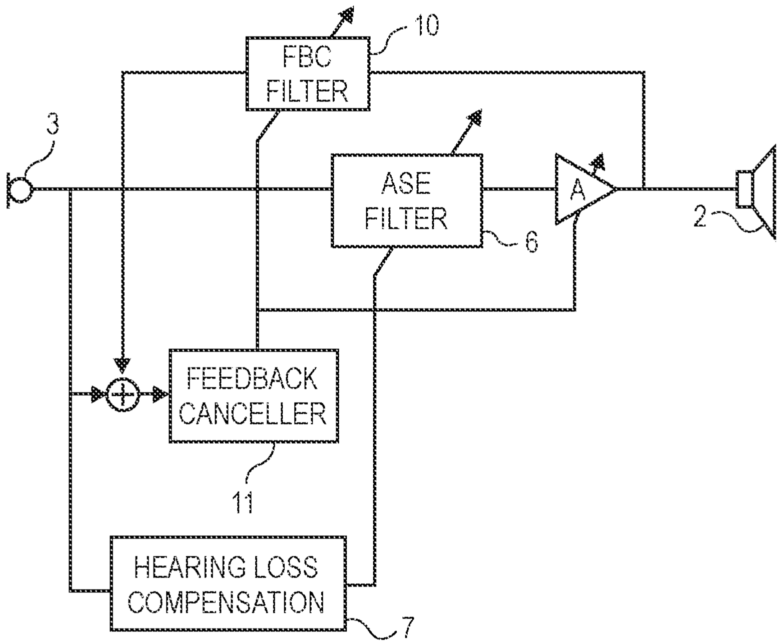
FIG. 5 is a block diagram of an audio system and related method for personalized ASE in which a hearing loss compensation block has disconnected a feedback cancellation filter from the forward path of the ASE and modifies a gain block A in response to the output of the filter.

When HLC 7 determines that the output of the FBC filter 10 should be disconnected from the signal chain that originates from the external microphone 3, the feedback canceller 11 should also stop computing updates to the FBC filter 10. However, there could be another mode of operation as shown in FIG. 5. There, even though the FBC filter 10 output is disconnected, the feedback canceller 11 continues to run with a "side chain" in which it continually monitors the feedback path strength by evaluating the sum of the signal from the microphone 3 and the output of the FBC filter 3.

The feedback canceller here applies the necessary gain adjustment to block A, similar to the optional approach depicted in dotted lines in FIG. 3. Thus, referring to FIG. 5, when the FBC filter 10 is disconnected, the signal from external microphone 3 becomes routed directly to the input of the ASE filter 6. At the same time, in the side chain process, a feedback corrected microphone signal is constructed (at the output of the summing junction) and is fed to an input of the feedback canceller 11 which analyzes the feedback corrected microphone signal to determine how to adjust the gain of the block A.

To aid the Patent Office and any readers of any patent issued on this application in interpreting the claims appended hereto, applicant wishes to note that it does not intend any of the claims or claim elements below to invoke 35 U.S.C. 112(f) unless the words "means for" or "step for" are explicitly used in the particular claim.

As would be readily understood, the use of personally identifiable information should follow privacy policies and practices that are generally recognized as meeting or exceeding industry or governmental requirements for maintaining the privacy of users. In particular, personally identifiable information should be managed and handled so as to minimize risks of unintentional or unauthorized access or use, and the nature of authorized use should be clearly indicated to users.

While certain aspects have been described and shown in the accompanying drawings, it is to be understood that such are merely illustrative of and not restrictive on the broad invention, and that the invention is not limited to the specific constructions and arrangements shown and described, since other modifications may occur to those of ordinary skill in the art. The description is thus to be regarded as illustrative instead of limiting.

What is claimed is:

1. A method for sound enhancement for an against the ear audio device, the method comprising:

determining signal to noise ratio, SNR, in an acoustic ambient environment of an against-the-ear audio device worn by a user, wherein the acoustic ambient environment contains speech by a talker that is used in determining the SNR;

determining whether the SNR is above a threshold, and in response to determining that the SNR is above the threshold, reducing dynamic range by applying positive gain versus input level as a customized upward compression, to soft sounds, and not loud sounds of an audio signal from one or more microphones of the audio device that comprises the speech of the talker; and in response to determining that the SNR is below the threshold, applying zero gain or negative gain to the soft sounds, and not the loud sounds, of the audio signal, that is less than the positive gain applied when the SNR is above the threshold.

2. The method of claim 1 wherein the against the ear audio device is a headphone.

3. The method of claim 1 wherein the against the ear audio device is a mobile phone handset.

4. The method of claim 1 wherein the determining the SNR comprises processing the audio signal to produce a noise estimate and a main signal estimate.

5. The method of claim 1 further comprising performing a beamforming process upon a plurality of microphone signals produced by the one or more microphones of the audio device, to produce the audio signal.

6. The method of claim 1 wherein determining SNR and reducing dynamic range are performed by a processor in a mobile phone handset.

7. The method of claim 1 wherein determining SNR and reducing dynamic range are performed by a processor in a headphone.

8. The method of claim 1 wherein the positive gain, zero gain or negative gain is a function of frequency.

9. The method of claim 1 wherein a value of the positive gain, zero gain or negative gain is determined in accordance with a hearing profile of the user who is wearing the against the ear audio device.

10. A headphone comprising:

a processor configured to determine signal to noise ratio, SNR, in an acoustic ambient environment of the headphone when worn by a user, wherein the acoustic ambient environment contains speech by a talker that is used to determine the SNR;

determine whether the SNR is above a threshold, and in response to determining that the SNR is above the threshold, reduce dynamic range by applying a positive gain versus input level as a customized upward compression, to soft sounds and not loud sounds of an audio signal from one or more microphones of the headphone that comprises the speech of the talker; and in response to determining that the SNR is below the threshold, apply zero gain or negative gain to the soft sounds and not the loud sounds of the audio signal, that is less than the positive gain applied when the SNR is above the threshold.

11. The headphone of claim 10 wherein the processor is configured to determine the SNR by processing the audio signal to produce a noise estimate and a main signal estimate.

12. The headphone of claim 10 wherein the processor is further configured to perform a beamforming process upon a plurality of microphone signals produced by the one or more microphones of the headphone, to produce the audio signal.

13. The headphone of claim 10 wherein the processor is configured to determine a value of the positive gain, zero gain or negative gain as a function of frequency.

14. The headphone of claim 10 wherein the processor is configured to determine a value of the positive gain, zero gain or negative gain in accordance with a hearing profile of the user who is wearing the against the ear audio device.

15. An audio processor comprising:

a processor configured to determine signal to noise ratio, SNR, in an audio signal from one or more microphones;

when determining that the SNR is above a threshold, and in response to determining that the SNR is above the threshold, reducing dynamic range by applying a positive gain versus input level as a customized upward compression, to soft sounds and not loud sounds of the audio signal; and when determining that the SNR is below the threshold, apply zero gain or negative gain to the soft sounds and not the loud sounds of the audio signal, that is less than the positive gain applied when the SNR is above the threshold.

16. The audio processor of claim 15 wherein the processor is configured to determine the SNR by processing the audio signal to produce a noise estimate and a main signal estimate.

17. The audio processor of claim 15 wherein the processor is further configured to perform a beamforming process upon a plurality of microphone signals, to produce the audio signal.

18. The audio processor of claim 15 wherein the processor is configured to determine a value of the positive gain, zero gain or negative gain as a function of frequency.

19. The audio processor of claim 15 wherein the processor is configured to determine a value of the positive gain, zero gain or negative gain in accordance with a hearing profile of a user.

20. The audio processor of claim 15 wherein the processor is configured for use in a headphone.

* * * * *